Patented Feb. 20, 1940

2,191,428

UNITED STATES PATENT OFFICE 2,191,428

DISSOLVING, SOFTENING, AND GELATINIZING AGENT

Rudolf Endres, Dessau-Rosslau, Germany, assignor to Deutsche Hydrierwerke Aktiengesellschaft, Berlin-Charlottenburg, Germany, a corporation of Germany No Drawing. Application May 20, 1937, Serial No. 143,757. In Germany May 23, 1936

4 Claims. (Cl. 106—40)

It has been found that the ester from tetrahydro-furfuryl alcohol and/or its homologues and higher molecular mono-basic carboxylic acids containing no less than 8 C atoms are excellent dissolving, softening and gelatinizing agents for cellulose derivatives such as cellulose esters and cellulose ethers. These esters are easily produced in a well known way by esterification of free carboxylic acids with tetrahydro-furfuryl alcohol or its homologues or by re-esterification of well known carmoxylic acid esters such as butyl ester, with tetrahydro-furfuryl alcohol or its homologues. The esterification products of the tetrahydro-furfuryl and methyl tetrahydro-furfuryl alcohol with fatty acid of cocoanut oil, palmitic acid, oleic acid, ricinoleic acid, stearic acid, hydroxy-stearic acid, fatty acid of rapeseed oil, montan acid, naphthenic acid, abietic acid, octyloxy-acetic acid, cyclohexyloxy-acetic acid, phenoxy-acetic acid, cresoxy-acetic acid, octyl-phenoxy-acetic acid, naphthoxy-acetic acid and the like have proven particularly suitable for the aforesaid purposes. Among these esters, the most important are the soap-forming carboxylic acid esters.

The suggested esters distinguish themselves compared with the hitherto used dissolving, softening and gelatinizing media, by a very good dissolving power for cellulose derivatives, an excellent gelatinizing capacity and, consequently, by a remarkable plasticizing action.

Varnishes, films or plastic masses produced in using the described esters, are to a high degree water-repelling, fast to light and cold, and quite compatible with other organic stuffs such as natural or artificial resins.

Example 1

In heating up 1 mol of stearic acid together with 1 mol of tetrahydro-furfuryl alcohol, preferably in the presence of an inert solvent such as xylol, for some hours until boiling, one obtains, after the solvent is distilled off, the stearic acid ester of the tetrahydro-furfuryl alcohol, which represents a clear and odourless liquid having a boiling point of 190–240° C. at 10 mm. Hg-pressure (main quantity 215–235° C.), having the acid number of 0 and saponification number 161.6.

When making a varnish suitable for shoe heels one proceeds by dissolving 15 parts by weight of nitrocellulose (of an alcohol-humidity 2:1) in a mixture of 15 parts by weight of ethyl acetate, 20 parts by weight of acetone, 10 of butyl acetate and 8 of cyclohexyl acetate, whereby one adds 40 parts by weight of toluol, 10 of xylol and 10 of tetrahydro-furfuryl stearate. To tint the mixture one may further add 3 parts by weight of an alcohol soluble dyestuff dissolved in 20 parts by weight of alcohol.

Example 2

1 mol of commercial oleic acid, when esterified with 1 mol of tetrahydro-furfuryl alcohol in the aforedescribed manner, gives the tetrahydro-furfuryl oleate, a colourless and odourless liquid, which at 3 mm. Hg-pressure boils between 230 and 260° C.; it is free of acid and its saponification number is 162.0.

For the manufacture of a water-fast lacquer (waterproof lacquer) one dissolves 2.5 parts by weight of highly viscous nitrocellulose (alcohol-humidity 2:1) in a mixture of 6.0 parts by weight of 85%-butyl-acetate, 6.0 parts by weight of butanol, 8.0 of cyclohexyl acetate, 12.0 of toluol and 12 of xylol, to which solution one adds 2.5 parts by weight of tetrahydro-furfuryl oleate and 8.0 parts by weight of resin alcohol (obtained by catalytic reduction from colophony). Then one incorporates into this solution 40.0 parts by weight of "Blanc fixe" by stirring.

I claim:
1. A stable water-repelling material of the group consisting of lacquers, and plastic masses suitable for forming water-proof surface coatings comprising a cellulose derivative and tetrahydro-furfuryl oleate.
2. A stable water-repelling material of the group consisting of lacquers, and plastic masses suitable for forming water-proof surface coatings comprising a cellulose derivative and tetrahydro-furfuryl stearate.
3. A stable water-repelling material of the group consisting of lacquers, and plastic masses suitable for forming water-proof surface coatings comprising a cellulose derivative and a tetrahydro-furfuryl ester of a higher molecular fatty acid containing 18 carbon atoms.
4. A stable water-repelling material of the group consisting of lacquers and plastic masses suitable for forming water-proof coatings comprising a cellulose derivative and a tetrahydro-furfuryl ester of a higher molecular fatty acid containing at least 16 carbon atoms.

RUDOLF ENDRES.